Figure 1:
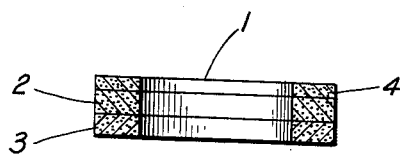

Sept. 28, 1965  F. G. BROCKMAN ETAL  3,209,181
TEMPERATURE-INDEPENDENT TRANSDUCER
Filed Sept. 11, 1962

INVENTORS.
FRANK G. BROCKMAN
PAUL W. BECK
BY Frank R. Trifari
AGENT

United States Patent Office 3,209,181
Patented Sept. 28, 1965

3,209,181
TEMPERATURE-INDEPENDENT TRANSDUCER
Frank G. Brockman, Dobbs Ferry, and Paul W. Beck, Irvington-on-Hudson, N.Y., assignors to North American Philips Company, Inc., New York, N.Y., a corporation of Delaware
Filed Sept. 11, 1962, Ser. No. 222,586
5 Claims. (Cl. 310—26)

Our invention relates to a transducer for converting magnetic or electric energy to mechanical energy and vice versa. More particularly, the invention relates to an element of a transducer in which the magnetic or electric energy is converted to mechanical energy, and vice versa, since the transducer also includes elements for coupling the device mechanically to a load and to a magnetic or electric field.

When a ferromagnetic body is magnetized, for example, its dimensions are changed slightly, and such changes are referred to as magnetostriction. Thus, a ferromagnetic body, when subjected to an alternating magnetic field, alternately elongates and contracts. Likewise, a piezoelectric body subjected to an alternating electric field also elongates and contracts.

If coupled to a suitable medium, such a body can convert magnetic or electric energy as the case may be, supplied by the field into mechanical energy supplied to the medium. Conversely, mechanical deformation of a ferromagnetic body results in a change of its magnetic induction which can induce an electromotive force in an electric circuit associated with it; similarly, a piezoelectric body when mechanically deformed develops an electric potential which can be coupled to an amplifier.

The efficiency of a body in converting magnetic or electric energy to mechanical energy, and vice versa, is determined by its electromechanical coupling coefficient, $k$, which is a quantity related to the stored mechanical and magnetic or electric energies. It is defined as the square root of the ratio of the converted stored energy to the input stored energy for the case of no losses or radiation. For maximum conversion of magnetic or electric energy to mechanical energy, this coefficient should be as large as possible, i.e., approach unity.

The electromechanical coupling coefficient, $k$, may be determined in accordance with the methods described in: (a) "Dynamic Measurements of the Magnetoelastic Properties of Ferrites," Virgil E. Bottom, Technical Note No. 49, Boulder Laboratories, National Bureau of Standards, distributed by U.S. Department of Commerce, Office of Technical Services (PB 151408); (b) "Electromechanical Evaluation of Magnetostrictive Cylinders of Resonance-Antiresonance Measurements," Ralph S. Woollett, USL Research Report No. 225, NE-051248-1 (Dec. 15, 1953).

The range of the coefficient, $k$, for some typical magnetostrictive materials may be found in: "Sonics," Theodor F. Hueter and Richard H. Bolt, John Wiley and Sons, Inc., New York (1955), second printing March 1960, Chapter 5. "Magnetostrictive Transducers" Table 5.1. "Magnetomechanical Coefficients of Three Important Magnetostrictive Materials at Internal Polarizing Field $H_0$."

In the Table 5.1 the three important magnetostrictive materials given are Annealed Nickel, 45 Permalloy, and Alfer. There the range of the coefficient $k$ is as follows:
Annealed Nickel, at 2 oersted polarizing field, $k=14\%$;
Annealed Nickel, at 15 oersted polarizing field, $k=31\%$;
45 Permalloy, at 7.5 oersted polarizing field, $k=12.4\%$;
Alfer, at 10 oersted polarizing field, $k=27\%$. In view of the fact that the reference, Sonics, classifies materials with coupling coefficients as low as 12.4% as being "important magnetostrictive materials," materials with coupling coefficients greater than 15% are considered to have "large" electromechanical coupling coefficients as this term appears hereinafter and in the claims.

The electromechanical coupling coefficient of a given material is, however, temperature dependent and will have a maximum value at a given temperature for a given material. For many applications, where temperature changes are encountered, this is undesirable.

It is an object of our invention to provide a transducer element which has a large electromechanical coupling coefficient substantially independent of temperature over its operating range.

Further objects of this invention will appear as the specification progresses.

We have found rather unexpectedly that temperature dependence of the electromechanical coupling coefficient can be minimized substantially by employing a plurality of bodies, each having an electromechanical coefficient of coupling which has a different temperature dependence, and which are united into a single composite body.

This is unexpected because each body also has a particular resonance frequency, i.e., a frequency determined by its dimensions at which the energy conversion is a maximum. If two or more such bodies are mechanically joined, for example by clamping the bodies together, although the variations of the electromechanical coupling coefficients with temperature may compensate one another, they may have different resonant frequencies which can result in multiple mechanical resonance, and render the structure unsuitable as an active element of a transducer.

It is essential to our invention that the composite body according to our invention be constituted of a plurality of discrete layers which are integrally united. For example, the layers may be united by sintering, or with a thin rigid layer of a cement, such as an epoxy resin. Each of the layers are so selected that the temperature variations of the electromechanical coupling coefficients can compensate one another.

We are aware that composite ferromagnetic bodies have been made by sintering two or more layers of ferromagnetic materials to minimize the temperature variation in magnetic permeability. Thus, in U.S. Patent 2,985,939, two or more ferrite layers are sintered together to produce a composite body whose permeability is substantially independent of temperature. Since permeability is a magnetic phenomenon, no mechanical effects, such as mechanical resonance, are involved. However, in the case of a magnetostrictive transducer which involves the conversion of magnetic energy to mechanical energy, it is surprising that a composite body constituted of a plurality of integrally united layers not only can have a coefficient of electromechanical coupling which is substantially independent of temperature, but also a single mechanical resonant frequency.

Although the invention will be described in detail with reference to specific materials, it should be clearly understood that these materials are exemplary only. The invention is not limited to these materials, or to the class of materials represented thereby, i.e. ferromagnetic ferrites. Thus, the invention is applicable to materials which exhibit a piezoelectric, or electrostrictive effect, for example, barium titanate, lead zirconate, and the like. The invention itself is defined with greater particularity in the claims.

Figure 3:
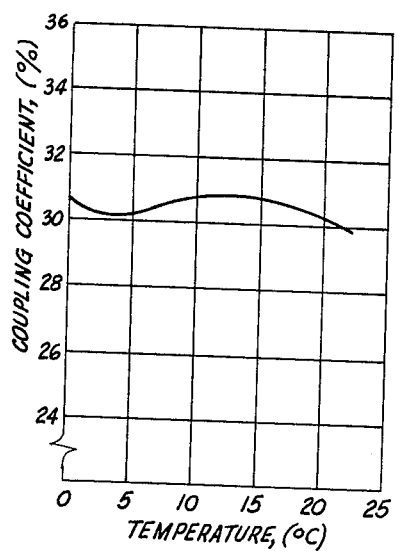
Figure 4:
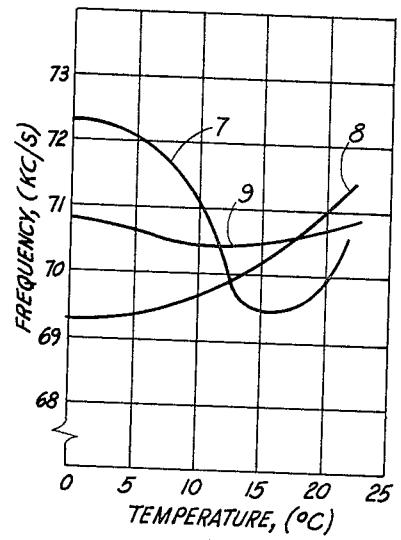

The invention will be described with reference to the accompanying drawing in which:
FIG. 1 is a sectional view of a toroidal multi-layer composite body according to the invention; and
FIGS. 2, 3 and 4 illustrate the variations with temperature of the coefficient of electromechanical coupling and resonance frequencies of compositions and bodies according to the invention.

Figure 2:
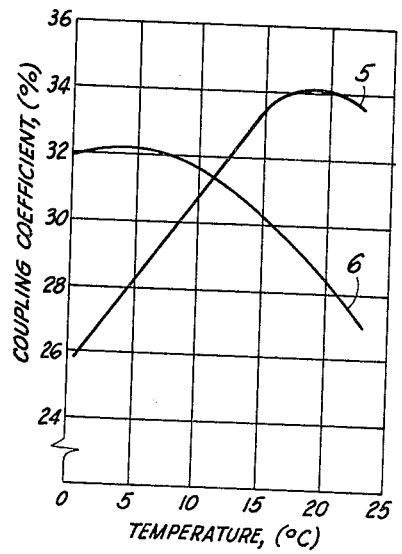

The toroidal core 1, shown in FIG. 1, is composed of three layers 2, 3, and 4, each consisting of a ferromagnetic material whose electromechanical coefficient of coupling varies with temperature as illustrated by curves 5 and 6 in FIG. 2, respectively.

In the form shown, the body was made by placing a quantity equal to about ⅓ the weight of the body of finely comminuted powder to form a layer having a composition $(Ni_{0.90}Zn_{0.10})_{0.878}Co_{0.022}Cu_{0.10}Fe_2O_4$ in a die, and placing on top of this layer a quantity equal to about ⅓ the weight of the body of a finely comminuted powder forming a second layer having a composition $$(NiO_{0.90}Zn_{0.10})_{0.874}Co_{0.026}Cu_{0.10}Fe_2O_4)$$

Finally, approximately the same weight of powder of the same composition as the first layer was placed atop the second layer. This three-layer structure was pressed and fired at a temperature of about 1250° C. for about 2 hours.

While these compositions can be considered as part of a group of compositions whose formula is $$(Ni_{0.90}Zn_{0.10})_{0.90-x}Co_xCu_{0.10}Fe_2O_4$$

wherein $x=0.022$ and $0.026$, it is to be understood that the invention is not limited to such compositions since other ferromagnetic materials may be employed.

The firing temperature, time of firing and atmosphere are not particularly critical, it being only necessary to sinter for a sufficient time to sinter the particles into discrete layers. While some diffusion between the layers may occur, this should, of course, be held to a minimum. The resulting body has an electromechanical coupling coefficient which varies little with temperature, as shown in FIG. 3.

Curve 7 of FIG. 4 illustrates the variation with temperature of the mechanical resonance frequency of a body whose composition corresponds to that of layer 2, curve 8 that of layers 3 and 4; and curve 9 that of the composite body. It is apparent that not only is the coefficient of electromechanical coupling substantially independent of temperature, but also the resonance frequency is substantially independent of temperature, and differs from that of either layer as an independent body.

While we have described our invention with reference to specific examples and applications thereof, we do not wish to be limited thereto as other modifications may be made without departing from the spirit and scope of the invention.

What we claim is:

1. A transducer element for converting magnetic or electric energy into mechanical energy and vice versa comprising a composite body consisting of a plurality of integrally united layers each of a material having a large electromechanical coupling coefficient which differs from that of at least one other layer, the temperature variation of the electromechanical coupling coefficient of the layers having values at which the electromechanical coupling coefficient of the composite body is substantially independent of temperature over its operating range.

2. A transducer element for converting magnetic energy into mechanical energy and vice versa comprising a composite body consisting of a plurality of integrally united layers each of a ferromagnetic ferrite material having a large electromechanical coupling coefficient, each of said layers having a given temperature variation of the electromechanical coupling coefficient which differs from that of the other layers, the temperature variation of the electromechanical coupling coefficient of the layers having values at which the electromechanical coupling coefficient is substantially independent of temperature over its operating range.

3. A transducer element for converting magnetic energy into mechanical energy and vice versa comprising a composite body consisting of a plurality of integrally united layers each of a ferromagnetic nickel-zinc-cobalt copper ferrite material having a large electromechanical coupling coefficient, each of said layers having a given temperature variation of the electromechanical coupling coefficient which differs from that of the other layers, the temperature variation of the electromechanical coupling coefficient of the layers having values at which the electromechanical coupling coefficient is substantially independent of temperature over its operating range.

4. A transducer for converting magnetic energy into mechanical energy and vice versa comprising a composite body consisting of a plurality of integrally united layers each of a ferromagnetic ferrite material with the composition $(Ni_{0.90}Zn_{0.10})_{0.90-x}Co_xCu_{0.10}Fe_2O_4$ wherein $x=0.022$ and $0.026$ having a large electromechanical coupling coefficient, each of said layers having a given temperature variation of the electromechanical coupling coefficient which differs from that of the other layers, the temperature variation of the electromechanical coupling coefficient of the layers having values at which the electromechanical coupling coefficient is substantially independent of temperature over its operating range.

5. A transducer for converting magnetic energy into mechanical energy and vice versa comprising a composite body consisting of a plurality of integrally united layers at least one of which has the composition $$(Ni_{0.90}Zn_{0.10})_{0.874}Co_{0.026}Cu_{0.10}Fe_2O_4$$

and another layer has the composition $$(Ni_{0.90}Zn_{0.10})_{0.878}Co_{0.022}Cu_{0.10}Fe_2O_4$$

each of said layers being ferromagnetic and having a large electromechanical coupling coefficient, each of said layers of the first composition having a given temperature variation of the electromechanical coupling coefficient which differs from that of the other layers, the temperature variation of the electromechanical coupling coefficient of the layers having values at which the electromechanical coupling coefficient is substantially independent of temperature over its operating range.

References Cited by the Examiner

UNITED STATES PATENTS 2,227,268   12/40   Mason _____ 310—86

MILTON O. HIRSHFIELD, *Primary Examiner.*